US011274949B2

(12) United States Patent
Fukui et al.

(10) Patent No.: US 11,274,949 B2
(45) Date of Patent: Mar. 15, 2022

(54) PROJECTION DEVICE

(71) Applicant: Panasonic Intellectual Property Management Co., Ltd., Osaka (JP)

(72) Inventors: Atsushi Fukui, Osaka (JP); Kazumasa Takata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 16/826,509

(22) Filed: Mar. 23, 2020

(65) Prior Publication Data

US 2020/0379331 A1 Dec. 3, 2020

(30) Foreign Application Priority Data

May 28, 2019 (JP) .............................. JP2019-099493

(51) Int. Cl.
*G01D 13/00* (2006.01)
*G01D 13/26* (2006.01)
*G02B 5/04* (2006.01)

(52) U.S. Cl.
CPC ............. *G01D 13/265* (2013.01); *G02B 5/04* (2013.01)

(58) Field of Classification Search
CPC ........ G01D 13/265; G02B 5/04; G02B 5/045; G02B 5/02; G02B 5/021; G02B 5/0215; G02B 5/0231; G03B 21/2033
See application file for complete search history.

(56) References Cited

U.S. PATENT DOCUMENTS

| 4,826,299 | A | 5/1989 | Powell | |
|---|---|---|---|---|
| 2001/0030638 | A1* | 10/2001 | Kashima | ................... F21V 5/00 345/102 |
| 2004/0027579 | A1* | 2/2004 | Lee | .................... G01B 9/02025 356/504 |
| 2005/0111240 | A1* | 5/2005 | Yonekubo | ................ G02B 5/04 362/617 |
| 2008/0259436 | A1 | 10/2008 | Kamijima | |
| 2008/0310171 | A1* | 12/2008 | Hiraishi | ................. G02B 5/045 362/339 |
| 2018/0259836 | A1 | 9/2018 | Fukui et al. | |

FOREIGN PATENT DOCUMENTS

| DE | 10 2007 048 681 | 4/2009 |
|---|---|---|
| EP | 3 474 047 | 4/2019 |
| JP | 9-307174 | 11/1997 |
| JP | 2002-75034 | 3/2002 |
| JP | 2008-198980 | 8/2008 |
| JP | 2011-203649 | 10/2011 |
| JP | 2018-146525 | 9/2018 |

OTHER PUBLICATIONS

Extended European Search Report dated Sep. 28, 2020 in European Patent Application No. 20166751.6.

* cited by examiner

*Primary Examiner* — Y M. Quach Lee
(74) *Attorney, Agent, or Firm* — Wenderoth, Lind & Ponack, L.L.P.

(57) ABSTRACT

Light emitted from laser light source is divided by prism into two light flux and light flux corresponding to light emitted from slope and slope. Light flux and light flux are diffused by diffusion plate and diffusion plate to become light flux and light flux. By overlapping light flux and light flux, a radiation distribution with a wide angle and high light intensity can be obtained.

7 Claims, 5 Drawing Sheets

PROJECTION DEVICE

BACKGROUND

1. Technical Field

The present disclosure relates to a projection device for distance measurement.

2. Description of the Related Art

In the related art, as a distance measurement method, there is known a phase difference detection method of performing amplitude modulation on light from a light source to measure a phase difference between reflected light from an object to be measured and the light source, or a Time Of Flight (TOF) method of irradiating an object to be measured with light having an extremely short pulse and measuring an arrival time of reflected light from the object to be measured to measure a distance.

In order to increase a measurable distance and improve measurement accuracy, it is necessary to use a semiconductor laser as the light source with a small-size and high-output to obtain high-frequency modulation or a very short pulse waveform.

The use of a laser light source is specified in JIS-C6802 in Japan from the viewpoint of safety for the human body and eyes. In particular, in a case in which there is a possibility that light enters the human eye, it is generally necessary to satisfy conditions of class 1 thereof.

In order to satisfy the conditions of class 1 and increase an output of the laser light source, it is necessary to increase a beam diameter of the laser light in a diffusion plate disposed on an emission surface of the projection device.

Specifically, in a case in which the beam diameter on the emission surface of the projection device is small, when a person looks at the projection device, a light source image formed on the retina of the eye is also small, so that light concentration increases and the eye is easily damaged. In order to prevent the problem, the light source image formed on the retina may be increased by increasing the beam diameter on the emission surface of the projection device. Therefore, a maximum value of the light output of the laser light source can be increased without damaging the eyes.

As the laser projection device of the related art, there is a device having a configuration in which a diffusion plate is disposed in a window of an emission portion of a semiconductor laser (for example, see Japanese Patent Unexamined Publication No. 9-307174).

In the technique disclosed in Japanese Patent Unexamined Publication No. 9-307174, light emitted from a laser light source is diffused and expanded by a concave lens, and the light is projected on a diffusion plate. In the diffusion plate, the light is diffused in a same direction. By using the concave lens, the beam diameter in the diffusion plate is increased.

The beam diameter of the laser light source is extremely small as several μm, but by using the concave lens and the diffusion plate a beam diameter which is much larger than the beam diameter, on the emission surface of the laser light source, is formed on the diffusion plate.

Therefore, when a person looks at the laser, an image of the light source formed on the retina of the eye is large, so that an upper limit of the laser output can be increased without damaging the eye.

SUMMARY

A projection device according to one aspect of the disclosure includes a prism being a triangular shape and having a first surface, a second surface, and a third surface; a light source emitting light to the first surface of the prism; and two diffusion plates disposed to face the second surface and the third surface of the prism, respectively. An apex angle formed by the second surface and the third surface of the prism is 5 degrees or greater and 90 degrees or smaller.

DETAILED DESCRIPTIONS

In the technique of the related art, since the light emitted from the laser light source is spread by the concave lens and the diffusion plate is irradiated with the light, in order to increase an apparent beam diameter of the laser light source, it is necessary to make a diffusion property of the diffusion plate extremely high.

Specifically, at a central portion of the diffusion plate, light is incident substantially perpendicular to an incident surface of the diffusion plate, but at a peripheral portion, light is obliquely incident on the incident surface of the diffusion plate. Therefore, in order to emit same diffusion light at the central portion and the peripheral portion of the diffusion plate, the diffusion property must be increased so as not to depend on an angle of the incident light.

If the apparent beam diameter of the laser light source on the diffusion plate is small, the brightness of the light source increases, and when a person looks at the projection device, the eye is damaged. Therefore, in order to ensure the laser safety of the projection device, it is necessary to use a diffusion plate having an extremely high diffusion property and increase the apparent beam diameter on the surface of the diffusion plate.

However, in a general ground-glass diffusion plate, light is diffused by multiple reflection of the light at a ground-glass portion. Therefore, if the light diffusivity is increased, a proportion of light returning from the diffusion surface to the laser light source increases, and light usage efficiency is greatly decreased.

Diffusion characteristics of the diffusion plate having high diffusion property are generally lambertian diffusion, and light in an oblique direction is weak. Since the diffusion surface is a flat diffusion surface, there is a problem that light diffusion of 180° or greater cannot be performed.

The disclosure is made in view of the above points, and an object of the disclosure is to provide a projection device that can emit light with a uniform and wide radiation angle, with a small light loss in a diffusion plate.

Hereinafter, embodiments of the disclosure will be described with reference to the drawings. The description of the preferred embodiments below are merely examples in nature, and are not intended to limit the disclosure, an application, or a use thereof.

Figure 1:
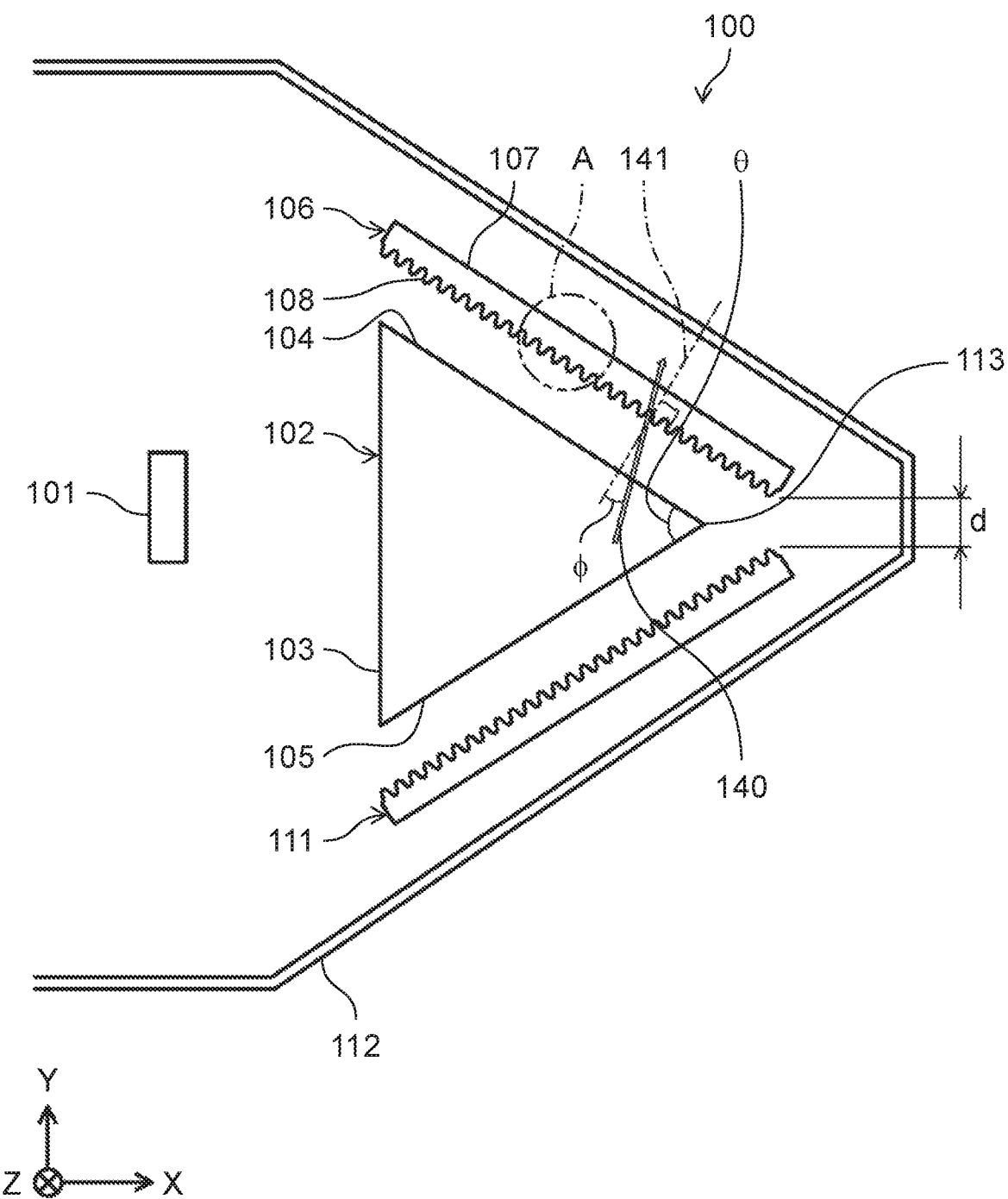
FIG. 1 is a schematic view illustrating a configuration of a laser projection device according to an embodiment.

FIG. 1 is a schematic view of a laser projection device according to the present embodiment. In FIG. 1, a rightward direction on a paper surface is an X axis, an upward direction is a Y axis, and a depth direction on the paper surface is a Z axis.

As illustrated in FIG. 1, laser projection device 100 includes laser light source 101, prism 102, diffusion plate 106 and diffusion plate 111, and transparent case 112.

Laser light source 101 emits light in a positive X-axis direction. The emitted light has a radiation distribution close to a Gaussian distribution in which a center of the radiation distribution is parallel to the X axis. The spread angle of laser light source 101 is desirably 5° or greater and 40° or smaller at a total angle at half maximum. Preferably, the angle is 30° or smaller.

A wavelength of laser light source 101 is a near-infrared monochromatic wavelength, and is not detected by the human eyes at the time of light emission. Laser light source 101 is formed by arranging a plurality of laser light emitting elements (not illustrated) close to each other in a YZ plane. By arranging the plurality of laser light emitting elements to be disposed, spatial coherence can be reduced and speckle noise can be reduced.

By using a laser as a light source, responsiveness can be higher than that of an LED, and pulse-shaped light with a short light emission time can be formed. Therefore, even if average energy is the same, it is possible to irradiate and measure a distant object in distance measurement or the like by increasing peak light intensity.

Prism 102 has an extruded shape having a triangular cross section in the XY plane and a constant cross-sectional shape in the Z-axis direction. That is, a side including an apex of a triangle of prism 102 is parallel to the Z-axis direction of any apex angle portion.

Bottom surface 103 of prism 102 is disposed to face laser light source 101, and is parallel to the YZ plane. Apex angle θ formed by slope 104 and slope 105 of prism 102 is set to an angle of 90° or smaller at which the light from laser light source 101 is totally reflected. Apex angle θ is desirably 5° or greater because if apex angle θ is too small, the intensity is insufficient, and prism 102 is easily broken.

Prism 102 is transparent at the wavelength of laser light source 101, and may be made of, for example, resin such as polycarbonate or acrylic, or glass.

A line connecting the center position of the bottom surface of prism 102 and apex 113 of prism 102 is disposed to be slightly shifted from an emission center of laser light source 101.

Diffusion plate 106 is formed of a thin flat member. Diffusion plate 106 is disposed so as to face slope 104 of prism 102. Groove portion 108 of diffusion plate 106 is on a prism 102 side, and an opposite surface of groove portion 108 is flat portion 107.

Diffusion plate 111 is a diffusion plate similar to diffusion plate 106 and is disposed so as to face slope 105 of prism 102, and a groove portion of diffusion plate 111 is on the prism 102 side.

Diffusion plate 106 and diffusion plate 111 are transparent at the wavelength of laser light source 101. A material thereof may be, for example, resin such as polycarbonate or acrylic, or glass.

Diffusion plate 106 and diffusion plate 111 are disposed with predetermined gap d therebetween. An interval of gap d is at least 0.05 mm or greater. By providing gap d, a risk of dust generation or damage due to contact between diffusion plate 106 and diffusion plate 111 can be reduced.

Light amount center line 140 indicates a direction in which a light amount of the radiation distribution of the light emitting from prism 102 is largest. Surface normal line 141 of diffusion plate 106 is disposed to be shifted by angle ϕ clockwise around the Z axis with respect to light amount center line 140. Angle ϕ is approximately ½ of the spread angle of laser light source 101.

Transparent case 112 has a triangular cross-sectional shape in the XY plane. Facing surfaces of transparent case 112 and diffusion plate 106, and transparent case 112 and diffusion plate 111 are substantially parallel to each other.

Figure 2:
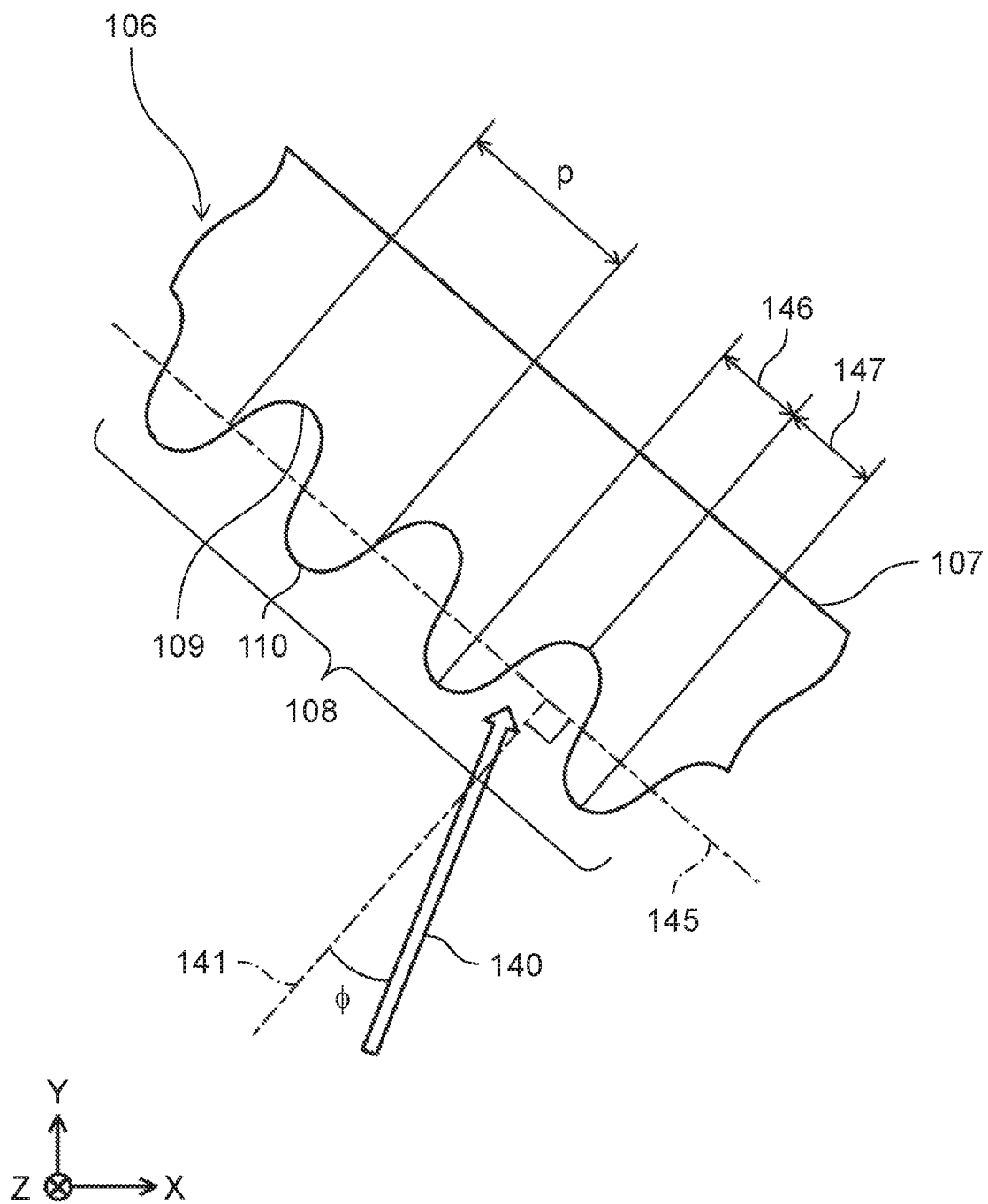
FIG. 2 is a partially enlarged sectional view illustrating a configuration of a diffusion plate.

FIG. 2 is an enlarged view of a portion surrounded by virtual circle A illustrated in FIG. 1. As illustrated in FIG. 2, groove portion 108 of diffusion plate 106 has a shape in which recess 109 and projection 110 are disposed adjacent to each other, and a combination of recess 109 and projection 110 is repeated at period p. In other words, groove portion 108 of diffusion plate 106 has a shape in which a plurality of recesses and projections are alternately arranged.

Groove portion 108 has an extruded shape having a constant cross-sectional shape in the Z-axis direction. In other words, the side including the triangular apex is parallel to any apex angle portion in the groove direction of groove 108.

Recess 109 and projection 110 have an aspherical shape, inclination angles of a contact portion between recess 109 and projection 110 are equal to each other, and recess 109 and projection 110 are smoothly joined. A shape obtained by rotating recess 109 by 180 degrees about the Z axis is a similar shape with a shape of projection 110. On the XY plane, line 145 passing through the connector between recess 109 and projection 110 is perpendicular to the normal direction of groove portion 108. The groove shape of diffusion plate 111 is the same as that of diffusion plate 106.

Figure 3:
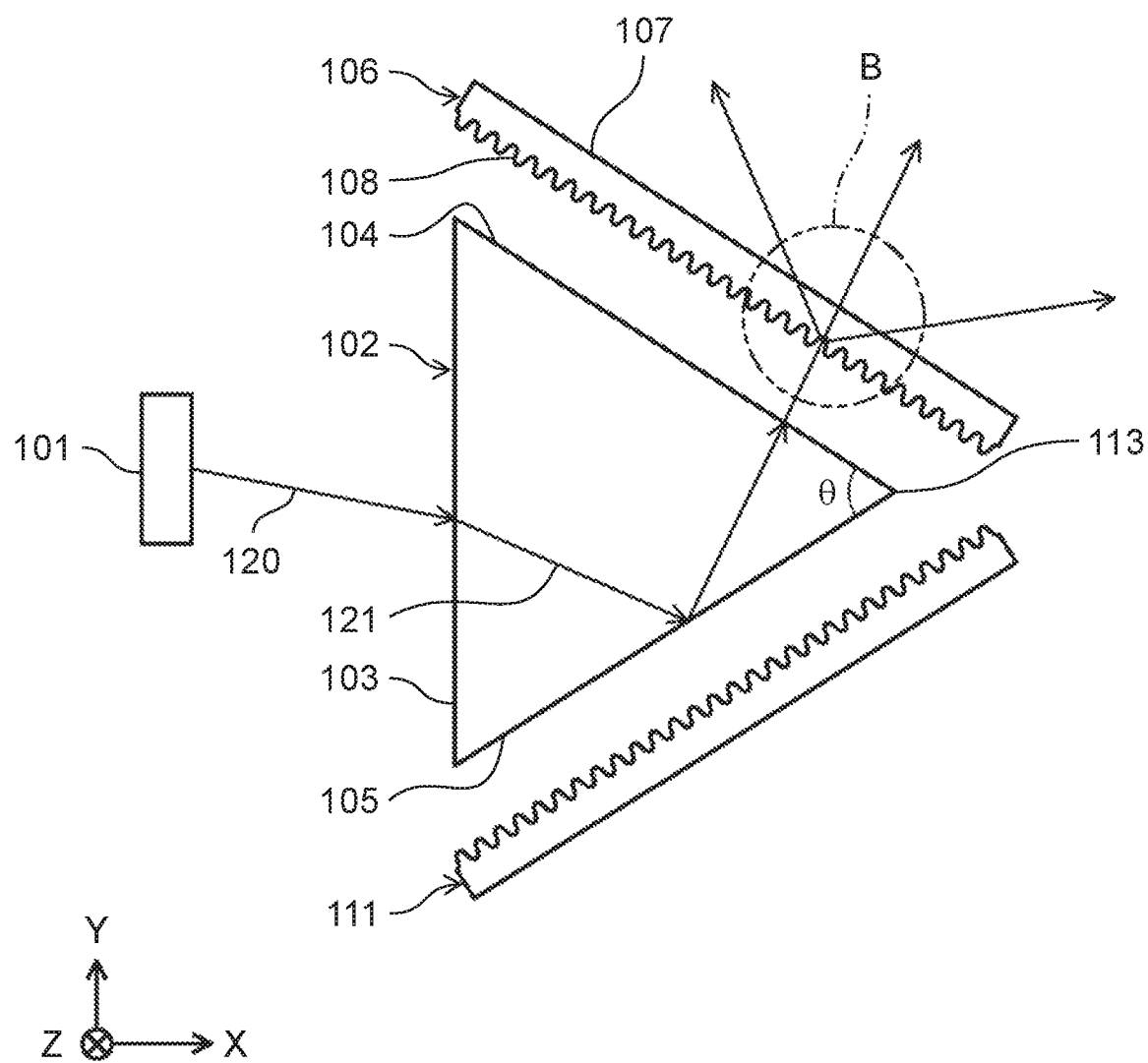
FIG. 3 is a view illustrating a light ray of the laser projection device.

Hereinafter, an operation of laser projection device 100 will be described. As illustrated in FIG. 3, light 120 emitted from laser light source 101 is incident on bottom surface 103 of prism 102 and is refracted to be light ray 121. Since apex angle θ of prism 102 is smaller than 90° and is set so as to be totally reflected on slope 105, most of light ray 121 is totally reflected on slope 105, and is incident on slope 104 facing slope 105.

Since light ray 121 is incident at an angle close to the normal direction of slope 104, most of the light passes through slope 104 and is emitted from prism 102. Light ray 121 emitted from slope 104 of prism 102 is incident on groove portion 108 of diffusion plate 106.

Figure 4:
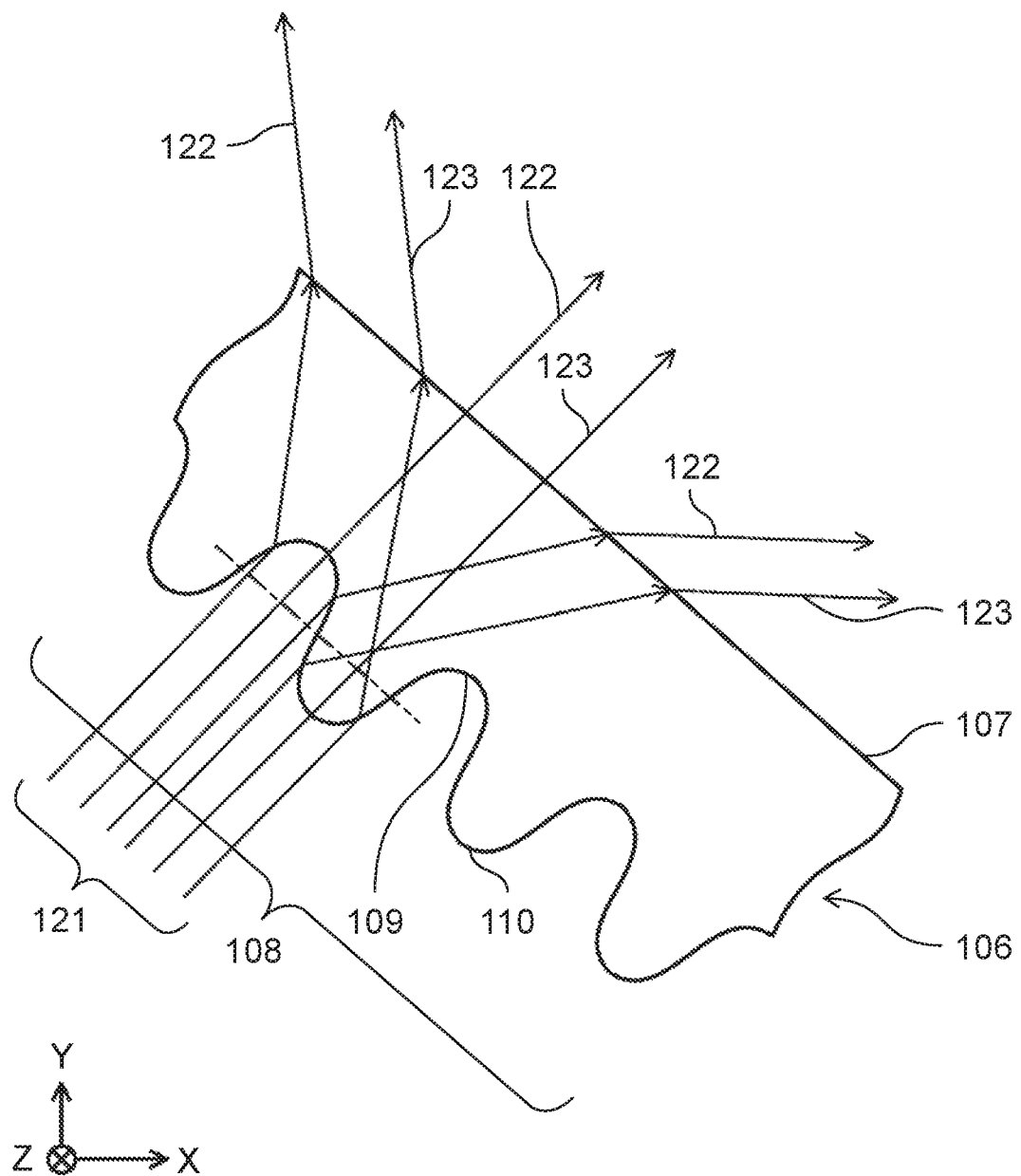
FIG. 4 is a view illustrating light diffusion due to refraction in the diffusion plate.

FIG. 4 is an enlarged view of a portion surrounded by virtual circle B illustrated in FIG. 3. As illustrated in FIG. 4, groove portion 108 is configured of recess 109 and projection 110. Light ray 122 incident on recess 109 is diffused by a concave lens effect. Light ray 123 incident on projection 110 is once collected, and then diffused.

The light diffused by groove portion 108 of diffusion plate 106 is refracted by flat portion 107 of diffusion plate 106 and emitted. Since a refractive index of diffusion plate 106 is larger than that of air, the light emitted from diffusion plate 106 has a wider spread angle. Therefore, light ray 121 incident on groove portion 108, in which recess 109 and projection 110 are arranged, is diffused by a refraction operation. The same applies to light which is totally reflected on slope 104 of prism 102, passes through the slope 105, and is diffused by diffusion plate 111.

Figure 5A:
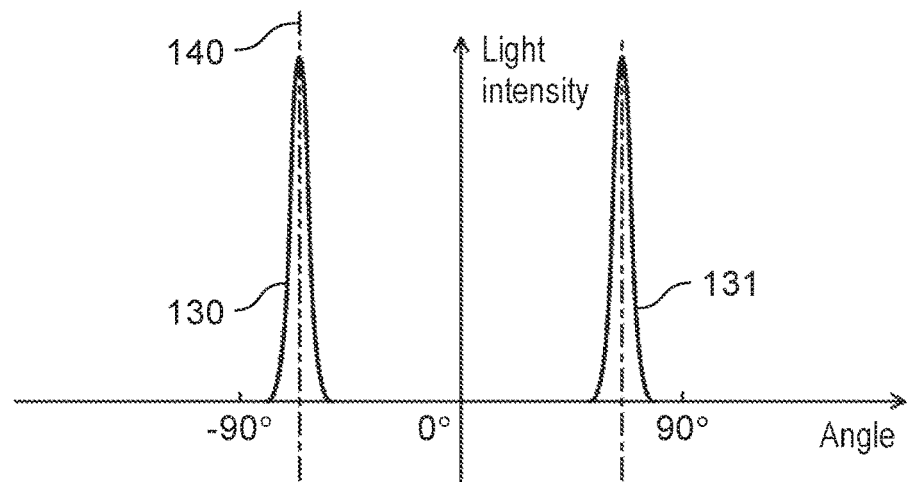
FIG. 5A is a graph illustrating a radiation angle distribution of light emitted from a slope of a prism.
Figure 5B:
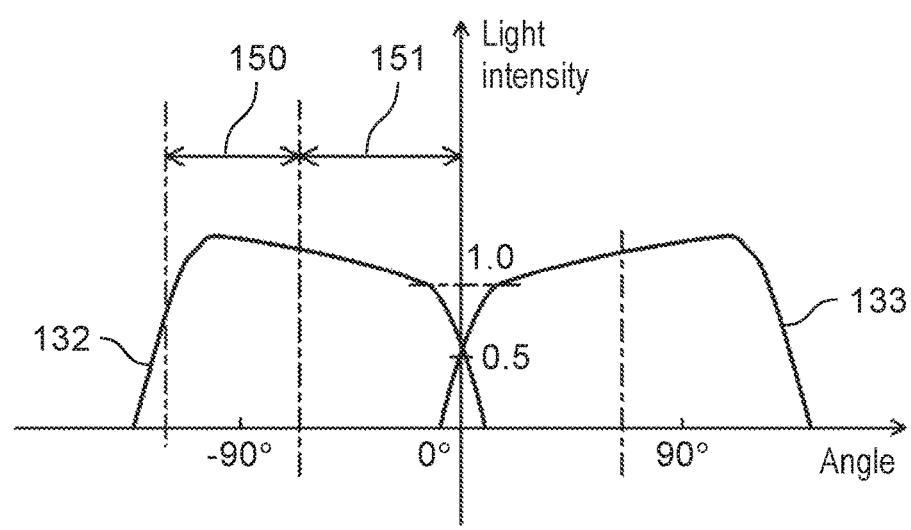
FIG. 5B is a graph illustrating a radiation angle distribution of light emitted from the diffusion plate.
Figure 5C:
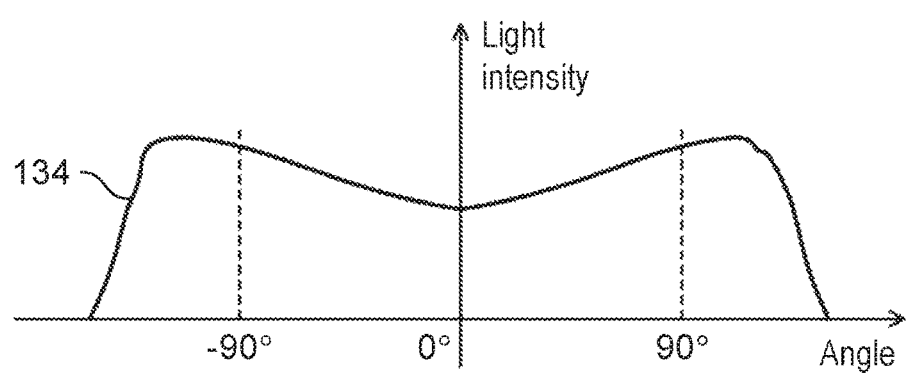
FIG. 5C is a graph illustrating a radiation angle distribution as the laser projection device when light fluxes of the diffusion plate are overlapped.

FIGS. 5A to 5C are graphs illustrating the radiation angle distribution of the light emitted from laser projection device 100 in the XY plane in FIG. 1. An angle is defined as 0 degree on the X axis passing through apex 113 of prism 102, when viewed in the positive direction from the negative direction of the Z axis, the clockwise direction with respect to the Z axis is defined as positive, and the counterclockwise direction is defined as negative.

FIG. 5A is a graph illustrating radiation angle distributions of light emitted from slope 104 and slope 105 of prism 102. As illustrated in FIG. 5A, the light emitted from laser light source 101 is split by prism 102 into two light flux 130 and light flux 131 corresponding to the light emitted from slope 104 and slope 105.

FIG. 5B is a graph illustrating radiation angle distributions of light emitted from diffusion plate 106 and diffusion plate 111. Light emitted from slope 104 and slope 105 of prism 102 is diffused by diffusion plate 106 and diffusion plate 111 to be light flux 132 and light flux 133.

Light flux 132, which is the light diffused from diffusion plate 106, has a spread in a negative direction of the radiation angle distribution, but the spread angle of diffusion plate 106 is set so as to slightly extend in the positive direction. Similarly, light flux 133, which is the light diffused from diffusion plate 111, has a spread in a positive direction of the radiation angle distribution, but the spread angle of diffusion plate 111 is set so as to slightly extend in the negative direction.

The radiation angle distribution of light flux 134 of the light emitted from diffusion plate 106 is such that the light intensity in the side in the negative direction is high and the light intensity in the direction of the angle 0° is low (see FIG. 5C). This is caused in FIG. 2 by the fact that light amount center line 140 of the light emitted from prism 102 is incident on groove portion 108 of diffusion plate 106 at angle ϕ with respect to surface normal line 141 in the XY plane.

When light amount center line 140 of the light emitted from prism 102 is incident on groove portion 108 at angle ϕ, an incident angle on slope 146 of groove portion 108 is decreased, so that a change in a light ray angle due to refraction is decreased. That is, diffusion in diffusion plate 106 is decreased. Since the refraction light on slope 146 of groove portion 108 is light that is diffused in the negative direction of the radiation angle distribution, the spread of the angle in the negative direction is decreased (see reference numeral 150 in FIG. 5B).

On the other hand, with respect to slope 147, the change in the light ray angle due to refraction is increased by increasing the incident angle. That is, diffusion in diffusion plate 106 is increased. Since the refraction light on slope 147 of groove portion 108 is light that is diffused in the side in the positive direction of the radiation angle distribution, the spread of the angle in the side in the positive direction is increased (see reference numeral 151 in FIG. 5B).

If light amount center line 140 is inclined at angle ϕ with respect to surface normal line 141, the light amount to slope 146 is larger than that to slope 147 and the light diffusion is decreased, so that the light intensity in negative direction is increased. Therefore, the radiation angle distribution of the light emitted from diffusion plate 106 has a high light intensity in the negative direction. The same applies to a case in which the light intensity in the side in the positive direction in the light emitted from diffusion plate 111 is increased.

FIG. 5C illustrates the radiation angle distribution of laser projection device 100 when light flux 132 of diffusion plate 106 and light flux 133 of diffusion plate 111 are overlapped. Light flux 132 diffused from diffusion plate 106 is set so as to spread not only in the negative direction of the angle but also partially in the positive direction of the angle (see FIG. 5B). Similarly, light flux 133 diffused from diffusion plate 111 is set so as to spread not only in the positive direction of the angle but also partially in the negative direction of the angle (see FIG. 5B).

Therefore, as illustrated in FIG. 5C, by overlapping light flux 132 and light flux 133, as light flux 134, the radiation distribution having slightly low light intensity near 0° and high light intensity in the positive direction and the negative direction can be obtained.

With such a radiation distribution, it is advantageous when observing the 0° direction, that is, the positive direction and the negative direction from a front of the laser projection device 100, that is, the periphery portion. By respectively setting the spread angle by the diffusion of diffusion plate 106 and diffusion plate 111 to 90° or greater, the combined spread angle can be 180° or greater.

On the other hand, the radiation distribution in the XZ plane remains at the spread angle of laser light source 101. In a case in which laser projection device 100 is mounted on an automobile or the like, by setting the XZ plane in the vertical direction and the XY plane in the horizontal direction, light can be efficiently emitted by spreading the light in the horizontal plane without spreading much light in the vertical direction.

When a laser class of laser light source 101 is calculated, a beam diameter in a diffusion plate of a projection optical system is involved in the laser class calculation. In the present embodiment, since the light is divided into two by prism 102 and each light is diffused, laser light source 101 is apparently divided into two, and in the laser class calculation, an upper limit of the laser light source output that becomes the laser class 1 can be improved.

Diffusion plate 106 and diffusion plate 111 can be manufactured by injection molding using a mold. In the present embodiment, groove portions 108 of diffusion plate 106 and diffusion plate 111 have an extruded shape with a smooth curve. Therefore, for example, a mold is easily manufactured by mechanical processing of shaper processing in a short time, and the diffusion plate can be manufactured at low cost by injection molding. It is less susceptible to deformation due to abrasion and poor transfer of molding in a manufacturing step of diffusion plate 106 and diffusion plate 111.

Since groove portions 108 of diffusion plate 106 and diffusion plate 111 are formed with smooth curves, for example, the inclination angle is locally increased at an edge or the like, unnecessary reflection or stray light is not caused near the edge. Unexpected spread of the diffusion due to abrasion of the edge portion cannot occur, and the light efficiency of the diffusion plate does not easily decrease.

Diffusion plate 106 and diffusion plate 111 are disposed with gap d therebetween, but the light emitted from laser light source 101 is divided into two by prism 102 and becomes light having an angle. Therefore, the light emitted from prism 102 hardly generates light in the 0° direction (see FIG. 5A). Therefore, light leakage from gap d between diffusion plate 106 and diffusion plate 111 hardly occurs.

In general, when an error occurs during assembly, it is difficult to make the radiation distribution center of laser light source 101 coincide with a symmetry axis of prism 102.

On the other hand, in the present embodiment, the radiation distribution of laser light source 101 is a Gaussian distribution and has the spread of 5° or greater at least at the total angle at half maximum, and the radiation distributions of diffusion plate 106 and diffusion plate 111 overlap each other at the angle 0°.

Therefore, even if the radiation distribution center of laser light source 101 and the symmetry axis of prism 102 are shifted, the light intensity in the direction of the angle 0° hardly becomes zero. Here, as the spread angle of the radiation distribution of laser light source 101 is increased, an allowable value of the deviation between the radiation distribution center of laser light source 101 and the symmetry axis of prism 102 can be increased.

According to such a configuration, the light emitted from laser light source 101 is divided into two by prism 102 and is diffused by diffusion plate 106 and diffusion plate 111 using two refractions, and the diffusion light is overlapped. Therefore, light loss in diffusion plate106 and diffusion plate 111 is small, and light with a spread angle of 180° or greater can be emitted.

By dividing the light source image of laser light source 101 into two, an apparent size of the light emitted from the light source can be increased and the laser output of the laser class 1 can be increased, so that a laser projection device capable of bright illumination can be provided.

Other Embodiments

The above embodiment may have the following configurations.

In the present embodiment, laser light source 101 has the plurality of laser light emitting elements arranged to reduce the spatial coherence. However, a laser light source having low spatial coherence such as a multi-mode type semiconductor laser may be used. A light emitting diode or a light emitting diode (SLD) having a small light emitting diameter may be used.

A single mode type semiconductor laser may also be used as long as speckle noise does not increase. If the size of the device may be made increased, HeNe, argon gas laser, or the like may be used.

In the present embodiment, the wavelength of laser light source 101 is set to near infrared. However, when the measurement light can be seen, visible light may be used. Alternatively, ultraviolet light may be used. Although laser light source 101 is used as the light source, an LED may be used although the response characteristics are deteriorated.

In the present embodiment, an anti-reflection film may be formed on flat portions 107 of diffusion plate 106 and diffusion plate 111 to reduce surface reflection.

In the present embodiment, diffusion plate 106 and diffusion plate 111 may have the same spread angle, or may have different spread angles by changing the shapes of recess 109 and projection 110 of groove portion 108.

In the present embodiment, the cross-sectional shape of prism 102 may be an isosceles triangle or a scalene triangle.

In the present embodiment, the cross section of transparent case 112 is triangular, but the disclosure is not limited to the embodiment. For example, although the radiation angle distribution slightly changes due to the lens effect, a cylindrical shape that becomes a semicircle in the XY plane of FIG. 1 may be used.

In the present embodiment, in order to spread the light in the XZ plane direction, a diffusion plate that diffuses light in the XZ plane may be disposed immediately after laser light source 101.

The projection device according to a first aspect includes a prism being a triangular shape and having a first surface, a second surface, and a third surface; a light source emitting light to the first surface of the prism; and two diffusion plates disposed to face the second surface and the third surface of the prism, respectively. An apex angle formed by the second surface and the third surface of the prism is 5° or greater and 90° or smaller.

In the projection device according to a second aspect, in the first aspect, a diffusion surface of each of the two diffusion plates may face the prism, and a surface of each of the two diffusion plates opposite to the diffusion surface may be formed in a planar shape.

In the projection device according to a third aspect, in the second aspect, the diffusion surface of each of the two diffusion plates may be formed in a groove shape in which a plurality of recesses and projections are alternately arranged.

In the projection device according to a fourth aspect, in the third aspect, the prism may be formed in an extruded shape having a constant cross-sectional shape, and a groove portion of the diffusion surface of each of the two diffusion plates may extend substantially in parallel to an extrusion direction of the prism.

In the projection device according to a fifth aspect, in the third or fourth aspect, a light diffusion angle a direction substantially in parallel to a groove direction of each of the two diffusion plates may be smaller than a light diffusion angle in a direction substantially perpendicular to the groove direction of each of the two diffusion plates.

In the projection device according to a sixth aspect, in any one of the first to fifth aspects, the two diffusion plates may be disposed with a predetermined gap therebetween.

In the projection device according to a seventh aspect, in any one of the first to sixth aspects, a light spread angle of each of the two diffusion plates may be 90° or greater.

In the projection device according to an eighth aspect, in any one of the first to seventh aspects, the projection device may further include a transparent cover disposed outside the light source, the prism, and the two diffusion plates. The transparent cover may have surfaces on which the light emitted from each of the two diffusion plates is incident and which face and are substantially parallel to the two diffusion plates.

In the projection device according to a ninth aspect, in any one of the first to eighth aspects, the light source may be a laser light source.

According to the disclosure, the light loss in the diffusion plate is small and the light of a uniform and wide radiation angle can be emitted.

In the projection device of the disclosure, light loss is small in the diffusion plate, light with a wide radiation angle can be emitted, an apparent beam is divided on the emission surface of the projection device, and the laser light source output can be increased within a range of laser class 1. Therefore, the disclosure can be applied to an on-vehicle sensor and a security sensor outdoors and a light source for a distance sensor of home appliances such as an air conditioner and lighting indoors.

What is claimed is:
1. A projection device comprising:
   a prism having an apex, a first surface as an incident surface, and a second surface and a third surface as emission surfaces;
   a light source emitting light to the first surface of the prism; and
   a first diffusion plate disposed to face the second surface, and a second diffusion plate disposed to face the third surface;

wherein a direction in which light is emitted from the light source is an X-axis direction, a direction orthogonal to the X-axis and parallel to a side including the apex of the prism is a Z-axis direction, and a direction orthogonal to the X-axis and Z-axis is a Y-axis, a cross section of the prism in a XY plane is triangular, an apex angle formed between the second surface and the third surface of the prism is 5 degrees or greater and 90 degrees or smaller, the first diffusion plate is disposed in parallel with the second surface at a predetermined distance from the second surface, and the second diffusion plate is disposed in parallel with the third surface at a predetermined distance from the third surface, a diffusion surface of each of the first and second diffusion plates has a groove portion in which a plurality of recesses and projections are alternately arranged, the diffusion surface of each of the first and second diffusion plates faces the prism, and a surface of each of the first and second diffusion plates opposite to the diffusion surface is a planar shape.

2. The projection device of claim 1, wherein the prism is a triangular prism having a triangular cross section in the XY plane, and wherein a groove direction of the s-groove portion of the each of the first and second diffusion plates extends in a direction parallel to the Z-axis.

3. The projection device of claim 1, wherein a light diffusion angle in a direction substantially parallel to the groove direction of each of the first and second diffusion plates is smaller than a light diffusion angle in a direction substantially perpendicular to the groove direction of each of the two diffusion plates.

4. The projection device of claim 1, wherein the first and second diffusion plates are disposed with a predetermined gap therebetween in the Y-axis direction.

5. The projection device of claim 1, wherein a light spread angle of each of the first and second diffusion plates is 90 degrees or greater.

6. The projection device of claim 1, further comprising:

a transparent cover disposed outside the light source, the prism, and the first and second diffusion plates, wherein the transparent cover has surfaces on which the light emitted from each of the first and second diffusion plates is incident and which face and are substantially parallel to the first and second diffusion plates.

7. The projection device of claim 1, wherein the light source is a laser light source.

\* \* \* \* \*